(12) United States Patent
Lehmann et al.

(10) Patent No.: US 12,507,626 B2
(45) Date of Patent: Dec. 30, 2025

(54) AGRICULTURAL HARVESTING VEHICLE

(71) Applicant: CLAAS Saulgau GmbH, Bad Saulgau (DE)

(72) Inventors: Martin Lehmann, Mühlingen (DE); Andreas Ott, Mengen-Rulfingen (DE); Stefan Wohnhas, Mittelbuch (DE); Josef Fischer, Biberach (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 475 days.

(21) Appl. No.: 18/111,834

(22) Filed: Feb. 20, 2023

(65) Prior Publication Data
US 2023/0263096 A1    Aug. 24, 2023

(30) Foreign Application Priority Data
Feb. 23, 2022    (DE) .......................... 102022104296.0

(51) Int. Cl.
*A01D 43/00* (2006.01)
*A01D 41/14* (2006.01)
(Continued)

(52) U.S. Cl.
CPC ......... *A01D 43/088* (2013.01); *A01D 41/142* (2013.01); *A01D 41/16* (2013.01)

(58) Field of Classification Search
CPC ..... A01D 43/088; A01D 41/142; A01D 41/16
See application file for complete search history.

(56) References Cited

U.S. PATENT DOCUMENTS 4,236,420 A * 12/1980 Geisthoff ............. A01B 71/066
                                                 74/380
5,221,232 A *  6/1993 Nameny .................. F16D 3/72
                                                 464/99
(Continued)

FOREIGN PATENT DOCUMENTS

DE    19712160 C1 *  6/1998 ............. B60K 17/22
DE    10324520       1/2006
(Continued)

OTHER PUBLICATIONS

English Translation of EP-1884151-A1 (Year: 2008).*
(Continued)

*Primary Examiner* — Claude J Brown

(57) ABSTRACT

Harvesting vehicle, in particular forage harvester or combine harvester, comprising a mounting frame (10), wherein the mounting fame (10) is designed to couple an attachment to the mounting frame (10) and via the mounting frame (10) to the harvesting vehicle, and comprising a drive coupler (16) which engages with the mounting frame (10) and which is designed to form a drive connection between the attachment and the harvesting vehicle in order to transmit a drive power provided by the harvesting vehicle in the direction of the attachment, wherein the drive coupler (16) has a drive hub (17) which can be coupled to the harvesting vehicle, a coupling disk (19) which can be coupled to the attachment and a centering mandrel (22) which cooperates with the attachment, wherein the centering mandrel (22) is fixedly engaged with the coupling disk (19), a slide piece (24) which can be displaced in a translatory manner relative to the drive hub (17) is coupled fixedly in terms of rotation to the drive hub (17), and wherein the slide piece (24) is connected to the coupling disk (19) via universal joints (30, 31) such that the centering mandrel (22) can be displaced together with the
(Continued)

coupling disk (19) and the slide piece (24) in a translatory manner relative to the drive hub (17).

11 Claims, 2 Drawing Sheets

(51) Int. Cl.
*A01D 41/16* (2006.01)
*A01D 43/08* (2006.01)

(56) References Cited

U.S. PATENT DOCUMENTS

| | | | | |
|---|---|---|---|---|
| 5,387,157 | A * | 2/1995 | Nameny | F16D 3/79 |
| | | | | 464/99 |
| 6,241,616 | B1 * | 6/2001 | Lightcap | F16C 3/03 |
| | | | | 464/158 |
| 9,743,588 | B2 * | 8/2017 | Dreer | A01D 41/142 |
| 10,034,425 | B2 * | 7/2018 | Ducroquet | A01D 41/142 |
| 2008/0271425 | A1 * | 11/2008 | Ricketts | A01D 41/16 |
| | | | | 56/15.6 |
| 2012/0102905 | A1 * | 5/2012 | Dold | A01D 41/16 |
| | | | | 56/12.7 |

FOREIGN PATENT DOCUMENTS

| | | | | |
|---|---|---|---|---|
| DE | 102012020994 | A1 | 4/2014 | |
| DE | 102013011834 | A1 | 1/2015 | |
| DE | 102018214424 | A1 * | 2/2020 | ........ F16D 3/32 |
| DE | 102018118799 | | 10/2021 | |
| EP | 1884151 | A1 * | 2/2008 | ........ A01D 41/16 |
| EP | 2826352 | A1 * | 1/2015 | ........ A01B 71/06 |
| FR | 2754132 | A1 * | 4/1998 | ........ F16D 1/076 |
| FR | 2855572 | A1 * | 12/2004 | ........ A01B 71/06 |
| WO | WO-2011095525 | A1 * | 8/2011 | ........ A01D 41/16 |
| WO | 2014173617 | A1 | 10/2014 | |

OTHER PUBLICATIONS

English Translation of FR-2855572-A1 (Year: 2004).*
English Translation of DE-19712160-C1 (Year: 1998).*
English Translation of EP-2826352-A1 (Year: 2015).*
English Translation of DE-102018214424-A1 (Year: 2020).*
English Translation of FR-2754132-A1 (Year: 1998).*
Search Report from German Patent Office; Oct. 18, 2022; 4 pages.

* cited by examiner

AGRICULTURAL HARVESTING VEHICLE

The invention relates to an agricultural harvesting vehicle.

DE 10 2018 118 799 A1 discloses an arrangement for the pendulum suspension of an attachment on an agricultural harvesting vehicle, wherein the arrangement has a carrier frame mounted on the harvesting vehicle and a pendulum frame mounted on the attachment. Rollers are mounted on the carrier frame on the harvesting vehicle side, support elements of the pendulum frame rolling on said rollers when a pendulum movement of the pendulum frame is performed.

DE 10 2013 011 834 B4 discloses a drive coupler of an agricultural harvesting vehicle. The drive coupler serves for providing a drive connection between a drive shaft of the harvesting vehicle and an attachment which is coupled to the harvesting vehicle and which is to be driven. The drive coupler disclosed therein has an articulated fork for coupling the drive shaft of the harvesting vehicle onto the drive coupler. Moreover, the drive coupler has a coupling disk for coupling an attachment onto the drive coupler. The drive coupler also has a centering mandrel. In the coupled-on state of an attachment, this centering mandrel cooperates with a centering bore thereof.

There is a need for a simply and compactly constructed drive coupler.

Proceeding therefrom, the object of the present invention is to provide a novel agricultural harvesting vehicle.

This object is achieved by an agricultural harvesting vehicle as claimed in claim 1.

According to the invention, the centering mandrel is fixedly engaged with the coupling disk.

According to the invention, a slide piece which can be displaced in a translatory manner relative to the drive hub is coupled fixedly in terms of rotation to the drive hub.

The slide piece according to the invention is connected to the coupling disk via universal joints, such that the centering mandrel can be displaced together with the coupling disk and the slide piece in a translatory manner relative to the drive hub.

In the drive coupler according to the invention, the centering mandrel can be displaced together with the coupling disk and the slide piece relative to the drive hub. The centering mandrel is fixedly engaged with the coupling disk which is connected via universal joints to the slide piece. A simple and compact construction of the drive coupler of the agricultural harvesting vehicle can be ensured.

Preferably, a central piece is coupled between the slide piece and the coupling disk, such that a first universal joint is formed between the slide piece and the central piece and a second universal joint is formed between the central piece and the coupling disk. This embodiment is particularly simple and compact. The central piece cooperates with the two universal joints in order to couple the coupling disk onto the slide piece in a manner which is fixed in terms of rotation.

Preferably, the drive hub has a recess with an internal toothing in which a portion of the slide piece having an external toothing engages, forming the coupling which is fixed in terms of rotation with the drive hub and the translatory displaceability relative to the drive hub. This also serves for providing a simply and compactly constructed drive coupler of an agricultural harvesting vehicle. The slide path is configured between the slide piece and the drive hub.

Preferably, the drive coupler has at least one spring element which is arranged between the coupling disk and the drive hub and covers the universal joints on the outside at least in some portions. A secure drive connection between the harvesting vehicle and the attachment can be provided via the at least one spring element. The at least one spring element permits a pre-orientation and pre-positioning of the drive coupler.

Preferably, a radially outwardly oriented projection engages with the central piece of the drive coupler or is configured therefrom, wherein a first spring element is supported on the drive hub and the projection and a second spring element is supported on the projection and the coupling disk. The first spring element and the second spring element can have variable spring constants. The first spring element covers the first universal joint on the outside at least in some portions. The second spring element covers the second universal joint on the outside at least in some portions. This embodiment of the drive coupler is particularly preferred in order to ensure a simple and compact construction. When two spring elements are used it is possible to ensure an improved compensation of the offset, when a small installation space of the drive coupler is required.

Preferred developments of the invention emerge from the dependent claims and the following description.

Exemplary embodiments of the invention are explained in more detail with reference to the drawing, without being limited thereto. In the drawing.

The invention relates to an agricultural harvesting vehicle.

The agricultural harvesting vehicle, in particular, is a self-propelled forage harvester or a self-propelled combine harvester.

Figure 1:
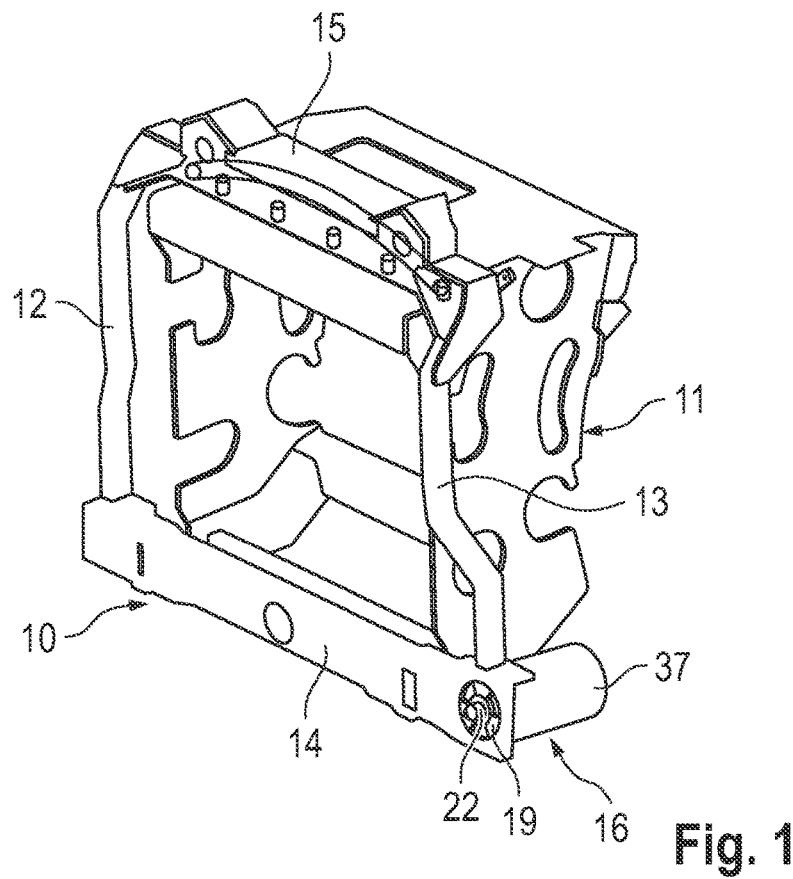
FIG. 1 shows a perspective view of a mounting frame configured as pendulum frame together with a feeder housing of a feeder unit and a drive coupler of an agricultural harvesting vehicle according to the invention.

FIG. 1 shows a perspective view of sub-assemblies of an agricultural harvesting vehicle, namely a mounting frame 10 and a feeder housing 11 of a feeder unit of the harvesting machine.

In FIG. 1 the mounting frame 10 is designed as a pendulum frame. Accordingly, the mounting frame 10 can perform a pendulum movement relative to the feeder housing 11. The mounting frame 10 serves for attaching an attachment, not shown, to the agricultural harvesting vehicle.

Two vertical struts 12, 13 and two horizontal struts 14, 15 are shown of the mounting frame 10, which is shown in FIG. 1 and configured as a pendulum frame.

The mounting frame 10 bears a drive coupler 16. The drive coupler 16 is designed to form a drive connection between the attachment to be driven and the harvesting vehicle.

This can be implemented, for example, such that a drive connection is produced with a drive shaft of the harvesting vehicle via the drive coupler 16 and an articulated shaft engaging with a first end of the drive coupler 16.

Figure 2:
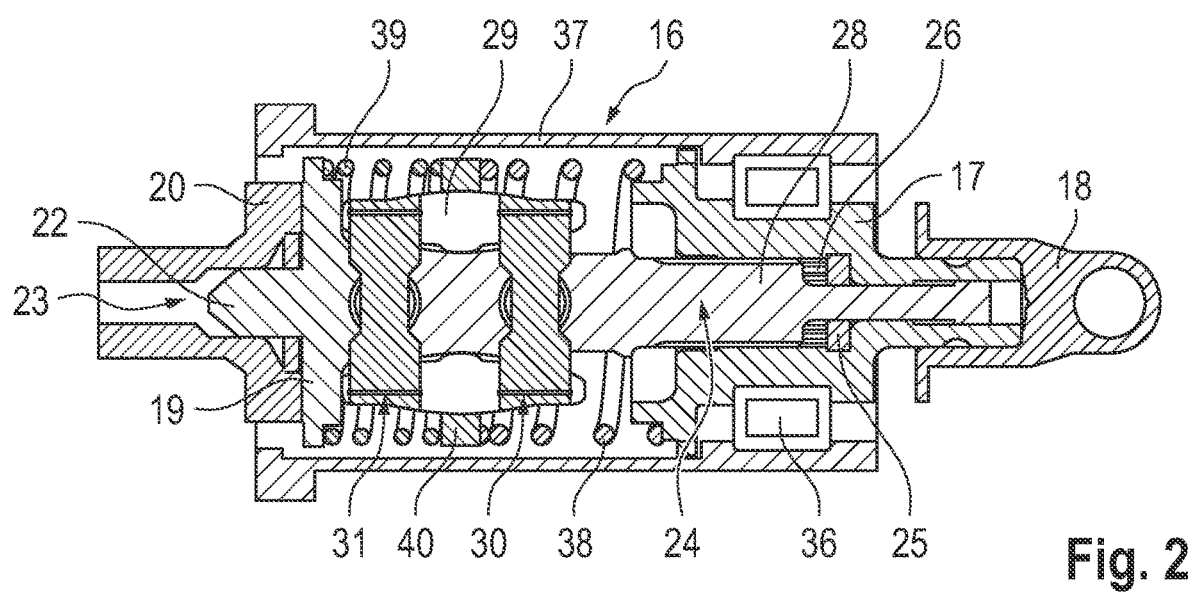
FIG. 2 shows a cross section through the drive coupler of the mounting frame in a first state.
Figure 3:
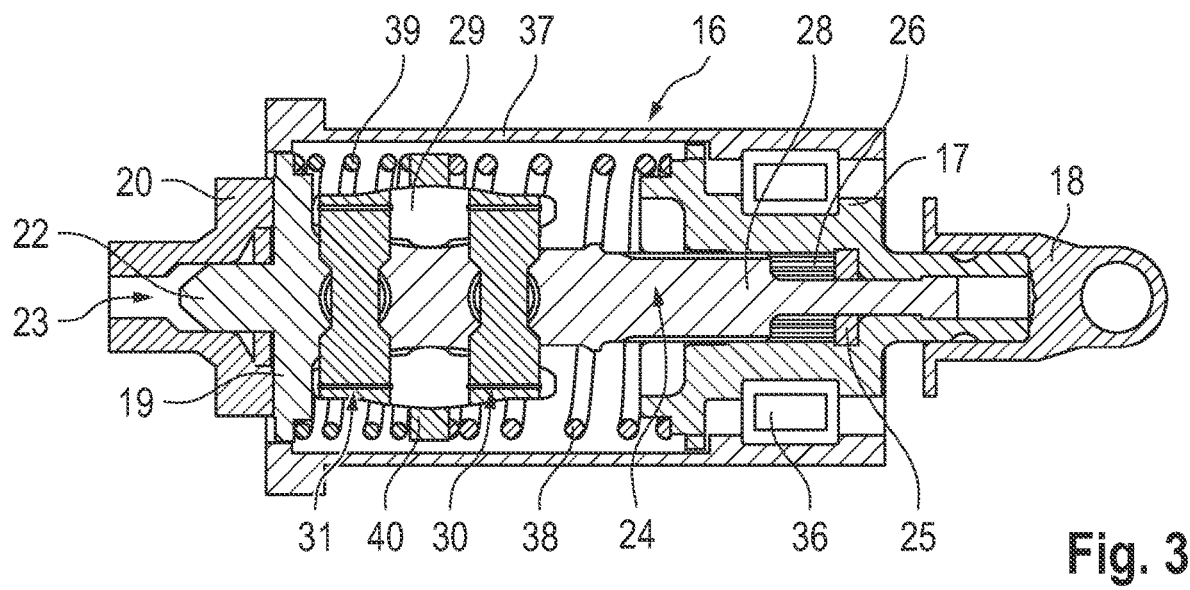
FIG. 3 shows a cross section through the drive coupler of the mounting frame in a second state.

Drive power provided on the drive shaft of the harvesting vehicle can be transmitted via the drive coupler 16 in the direction of the attachment which engages with a second end of the drive coupler 16. FIGS. 2 and 3 show a cross section through the drive coupler 16 in two different states thereof.

The drive coupler 16 has a drive hub 17, the drive coupler 16 being able to be coupled thereby to the harvesting vehicle. The drive hub 17 in FIGS. 2 and 3 is coupled to a connecting piece 18 of an articulated shaft, not shown further, of the harvesting vehicle.

The drive coupler 16 also has a coupling disk 19 which serves for coupling the drive coupler 16 to the attachment. FIGS. 2 and 3 show a coupling disk 20 of the attachment which is coupled to the coupling disk 19 of the drive coupler 16.

Figure 4:
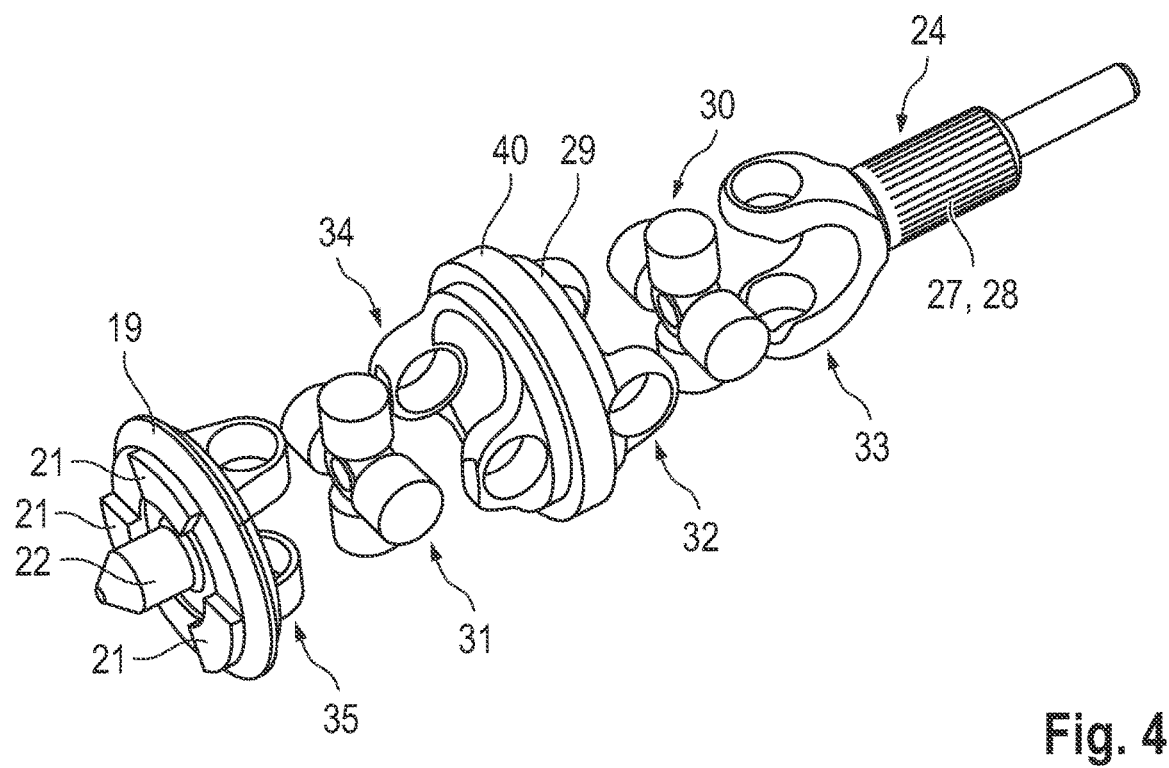
FIG. 4 shows an exploded view of a detail of the drive coupler.

The two coupling disks 19, 20 form a positive coupling, in particular a claw coupling, wherein FIG. 4 shows projections 21 of the coupling disk 19 of the drive coupler 16 which, when the coupling disk 20 of the attachment is coupled to the drive coupler 16, engage in corresponding recesses in the coupling disk 20 of the attachment.

A centering mandrel 22 is fixedly engaged with the coupling disk 19 of the drive coupler 16. When the coupling disk 20 of the attachment is in engagement with the coupling disk 19 of the drive coupler 16, the centering mandrel 22 of the coupling disk 19 of the drive coupler 16 engages in a centering recess 23 of the coupling disk 20 of the attachment.

As already set forth above, if the centering mandrel 22 is fixedly engaged with the coupling disk 19 of the drive coupler 16, accordingly no relative movement is possible there-between.

The drive hub 17 of the drive coupler 16 is coupled fixedly in terms of rotation to a slide piece 24 of the drive coupler 16. The slide piece 24 can be displaced in a translatory manner relative to the drive hub 17.

The drive hub 17 of the drive coupler 16 has a recess 25 with an internal toothing 26.

A portion 28 of the slide piece 24 having an external toothing 27 engages in this recess 25, forming the coupling which is fixed in terms of rotation between the slide piece 24 and the drive hub 17 and providing the translatory displaceability of the slide piece 24 relative to the drive hub 17.

The slide piece 24 of the drive coupler 16 is coupled to the coupling disk 19 of the drive coupler 16 via a central piece 29. The coupling of the slide piece 24 and coupling disk 19 of the drive coupler 16 via the central piece 29 is implemented via universal joints 30, 31 in order to provide a compensation of the offset between the slide piece 24 and the coupling disk 19 of the drive coupler 16.

The connection of the slide piece 24 to the coupling disk 19 of the drive coupler 16 via the universal joints 30, 31 is configured such that the centering mandrel 22 can be displaced together with the coupling disk 19 of the drive coupler 16 and the slide piece 24 relative to the drive hub 17.

In the preferred exemplary embodiment shown, the slide piece 24 is coupled to the coupling disk 19 of the drive coupler 16 via the central piece 29. A first universal joint 30 is formed between the slide piece 24 and the central piece 29, and a second universal joint 31 is formed between the central piece 29 and the coupling disk 19 of the drive coupler 16.

The central piece 29 forms a double fork, so to speak, wherein a first fork 32 of the central piece 29 is coupled to a fork 33 of the slide piece 24 via the first universal joint 30, and wherein a second fork 34 of the central piece 29 is coupled to a fork 35 of the coupling disk 19 of the drive coupler 16 via the second universal joint 31.

The aforementioned forks 32, 33, 34 and 35 of the central piece 29, slide piece 24 and coupling disk 19 of the drive coupler 16 have in each case two recesses into which corresponding projections of the universal joints 30, 31 engage.

As already set forth above, the centering mandrel 22 which is fixedly engaged with the coupling disk 19 of the drive coupler 16 can be displaced together with the coupling disk 19 of the drive coupler 16 and the slide piece 24, i.e. also together with the central piece 29, in a translatory manner relative to the drive hub 17. A drive connection which is fixed in terms of rotation is present between the coupling disk 19 of the drive coupler 16 and the drive hub 17 thereof.

According to FIGS. 2 and 3, the drive hub 17 of the drive coupler 16 is rotatably mounted via at least one bearing 36 in a housing 37 of the drive coupler 16.

The drive coupler 16 has at least one spring element, in the exemplary embodiment shown two spring elements 38, 39.

The at least one spring element is arranged between the coupling disk 19 of the drive coupler 16 and the drive hub 17 thereof. The at least one spring element 38, 39 covers the universal joints 30, 31 on the outside at least in some portions.

In the exemplary embodiment shown, a radially outwardly oriented projection 40 is configured on the central piece 29. This projection can either be an integral constituent part of the central piece 29 or alternatively can be configured as a separate component and fastened to the central piece 29. A first spring element 38 is supported on the drive hub 17 and on a first axial side of the projection 40. A second spring element 39 extends on an opposing second axial side of the projection 40 and on the coupling disk 19 of the drive coupler 16. The first spring element 38 covers the first universal joint 30 radially outwardly, and the second spring element 39 covers the second universal joint 31 radially outwardly.

Preferably, the two spring elements 38, 39 have different axial lengths and/or a different number of windings and/or a variable spring constant.

The drive coupler 16 of the harvesting vehicle according to the invention has a simple and compact construction. The centering pin 22 is fixedly fastened to the coupling disk 19 of the drive coupler 16. Said centering pin can be displaced together with the slide piece 24 relative to the drive hub 17 of the drive coupler 16.

LIST OF REFERENCE SIGNS

10 Mounting frame
11 Feeder housing
12 Vertical strut
13 Vertical strut
14 Horizontal strut
15 Horizontal strut
16 Drive coupler
17 Drive hub
18 Connecting piece
19 Coupling disk
20 Coupling disk
21 Projection
22 Centering pin
23 Centering recess
24 Slide piece
25 Recess
26 Internal toothing
27 External toothing
28 Portion
29 Central piece
30 Universal joint
31 Universal joint 32 Fork
33 Fork
34 Fork
35 Fork
36 Bearing
37 Housing
38 Spring element
39 Spring element
40 Projection

The invention claimed is:

1. A harvesting vehicle comprising
a mounting frame (10), wherein the mounting fame (10) is designed to couple an attachment to the mounting frame (10) and via the mounting frame (10) to the harvesting vehicle,
a drive coupler (16) which engages with the mounting frame (10) and which is designed to form a drive connection between the attachment and the harvesting vehicle in order to transmit a drive power provided by the harvesting vehicle in the direction of the attachment,
wherein the drive coupler (16) has a drive hub (17) which can be coupled to the harvesting vehicle, a coupling disk (19) which can be coupled to the attachment and a centering mandrel (22) which cooperates with the attachment, wherein
the centering mandrel (22) is fixedly engaged with the coupling disk (19),
a slide piece (24) which can be displaced in a translatory manner relative to the drive hub (17) is coupled fixedly in terms of rotation to the drive hub (17),
the slide piece (24) is connected to the coupling disk (19) via universal joints (30, 31), such that the centering mandrel (22) can be displaced together with the coupling disk (19) and the slide piece (24) in a translatory manner relative to the drive hub (17).

2. The harvesting vehicle as claimed in claim 1, wherein a central piece (29) is coupled between the slide piece (24) and the coupling disk (19), such that a first universal joint (30) is formed between the slide piece (24) and the central piece (29) and a second universal joint (31) is formed between the central piece (29) and the coupling disk (19).

3. The harvesting vehicle as claimed in claim 2, wherein a radially outwardly oriented projection (40) engages with or is configured on the central piece (29), wherein a first spring element (38) is supported on the drive hub (17) and the projection (40) and a second spring element (39) is supported on the projection (40) and the coupling disk (19).

4. The harvesting vehicle as claimed in claim 3, wherein
the first spring element (38) covers the first universal joint (30) on the outside at least in some portions,
the second spring element (39) covers the second universal joint (31) on the outside at least in some portions.

5. The harvesting vehicle as claimed in claim 3, wherein the first spring element (38) and the second spring element (39) have a variable spring constant.

6. The harvesting vehicle as claimed in claim 1, wherein the drive hub (17) has a recess (25) with an internal toothing (26) in which a portion (28) of the slide piece (24) having an external toothing (27) engages, forming the coupling which is fixed in terms of rotation with the drive hub (17) and the translatory displaceability relative to the drive hub (17).

7. The harvesting vehicle as claimed in claim 1, wherein the drive coupler (16) has at least one spring element (38, 39) which is arranged between the coupling disk (19) and the drive hub (17) and covers the universal joints (30, 31) on the outside at least partially in some portions.

8. The harvesting vehicle as claimed in claim 1, wherein the mounting frame (10) is configured as a pendulum frame.

9. The harvesting vehicle as claimed in claim 1, characterized by a feeder unit with a feeder housing (11), wherein the mounting frame (10) is mounted on the feeder housing (11).

10. The harvesting vehicle of claim 1, wherein the harvesting vehicle is a forage harvester.

11. The harvesting vehicle of claim 1, wherein the harvesting vehicle is a combine harvester.

* * * * *